United States Patent
Tsai

(10) Patent No.: US 7,826,677 B2
(45) Date of Patent: Nov. 2, 2010

(54) IMAGE PROCESSING APPARATUS AND METHOD

(75) Inventor: Yu-Seng Tsai, Sanchong (TW)

(73) Assignee: Quanta Computer Inc., Tao Yuan Shien (TW)

( * ) Notice: Subject to any disclaimer, the term of this patent is extended or adjusted under 35 U.S.C. 154(b) by 872 days.

(21) Appl. No.: 11/786,964

(22) Filed: Apr. 13, 2007

(65) Prior Publication Data

US 2008/0107334 A1    May 8, 2008

(30) Foreign Application Priority Data

Oct. 3, 2006    (TW) ................ 95136637 A

(51) Int. Cl.
     *G06K 9/40*      (2006.01)
(52) U.S. Cl. ................... 382/260; 375/240.12; 708/203
(58) Field of Classification Search ................ 382/260, 382/232, 233, 235, 244, 245; 375/240.16, 375/240.15, 240.14, 240.12
See application file for complete search history.

(56) References Cited

U.S. PATENT DOCUMENTS

| | | | |
|---|---|---|---|
| 4,375,083 A * | 2/1983 | Maxemchuk | ............... 704/278 |
| 5,339,409 A * | 8/1994 | Sakuragi | ............................. 1/1 |
| 6,246,719 B1 | 6/2001 | Agarwal | |
| 6,373,803 B2 * | 4/2002 | Ando et al. | ............... 369/59.25 |
| 2005/0088539 A1 * | 4/2005 | Nakazono et al. | ........ 348/231.3 |
| 2005/0198214 A1 * | 9/2005 | Inoue | ........................ 709/219 |
| 2006/0041886 A1 * | 2/2006 | Shintani | ..................... 718/100 |
| 2006/0061795 A1 * | 3/2006 | Walmsley | .................. 358/1.14 |
| 2006/0165297 A1 | 7/2006 | Chiang et al. | |
| 2006/0280075 A1 * | 12/2006 | Kanegae et al. | ........... 369/47.21 |

FOREIGN PATENT DOCUMENTS

| | | |
|---|---|---|
| JP | 2005-136891 A | 10/2003 |
| KR | 2001-0040244 | 3/2000 |

* cited by examiner

*Primary Examiner*—Daniel G Mariam
*Assistant Examiner*—Aklilu k Woldemariam
(74) *Attorney, Agent, or Firm*—Thomas, Kayden, Horstemeyer & Risley

(57) ABSTRACT

The invention provides an image processing apparatus and method, for processing a captured or recorded image with a dimension of M×N temporarily stored in an external memory; M and N are both integers larger than 1. The image processing apparatus includes a reading module, a buffer, a first processing module, a second processing module, and a writing module. Particularly, the image processing apparatus and method of the invention is a tile-based apparatus and method, which can decrease the width of the buffer and further reduce the hardware cost.

6 Claims, 5 Drawing Sheets

IMAGE PROCESSING APPARATUS AND METHOD

BACKGROUND OF THE INVENTION

1. Field of the Invention

The present invention is related to an image processing apparatus and method and, more particularly, to an image processing apparatus and method for processing a captured or recorded image.

2. Description of the Prior Art

With the development of technology and the increasing demands of people's daily lives, digital image capturing/recording systems, such as webcamcorder, digital still camera, digital video camera, are developed and replaced at high speed. Furthermore, electronic devices integrated with digital image capturing/recording system, such as mobile phone and PDA, have become the major electronic utilities of the consumer electronic product market.

Please refer to FIG. 1, which shows a functional block of an image processing apparatus of the prior art. The image processing apparatus 7 applies an image sensor 72, such as a CCD or CMOS, to transfer the optical signal to electronic signal, that is raw data. The raw data can further be processed by an image pipeline 74 to become an output image, such as YUV image. Subsequently, the output image can be stored in an external memory 76. Moreover, the output image can further be processed by an encoder 78 to become a formatted image, such as JPEG format image or MPEG format image, that complies with an image format, and the formatted image can be stored in the external memory 76.

Please further refer to FIG. 2, which shows a functional block of another image processing apparatus of the prior art. As shown in FIG. 2, in the prior art, to process images with increasing size, the raw data obtained by the image sensor 82 are first divided into a plurality of fragments, then the fragments are further stored in a plurality of buffers 84. Afterward, the fragments are also sequentially processed by the image pipeline 86. Therefore, the width of the buffers 84 is equal to the width of the raw data. When the number of raw data increases (the width of the raw data increases), the width of the buffers has to be increased; thus, the hardware cost is also increased.

SUMMARY OF THE INVENTION

Accordingly, a scope of the invention is to provide an image processing apparatus and method. Particularly, the image processing apparatus and method of the invention is a tile-based apparatus and method, which can decrease the width of the buffer and can further reduce the hardware cost.

According to a preferred embodiment, the image processing apparatus of the present invention is applied to process a captured or recorded image with a dimension of M×N stored in an external memory; M and N are both integers larger than 1. Moreover, the image processing apparatus includes a reading module, a buffer, a first processing module, a second processing module, and a writing module.

Furthermore, the reading module is coupled to the external memory, for sequentially reading a plurality of first image tiles divided from the image stored in the external memory, wherein each of the first image tiles has a dimension of p×q and overlaps with the adjacent first image tiles; p is an integer larger than 1 and less than M, and q is an integer larger than 1 and less than N.

The buffer is coupled to the reading module, for sequentially buffering the first image tiles read by the reading module. The first processing module is coupled to the buffer, for sequentially performing an image processing procedure for the first image tiles buffered in the buffer.

In addition, the second processing module is coupled to the first processing module, for sequentially processing the first image tiles processed by the first processing module into a plurality of second image tiles, and each of the second image tiles has a dimension of m×n: m is a natural number less than p, and n is a natural number less than q.

The writing module is coupled to the second processing module and the external memory respectively, for sequentially writing the second image tiles into the external memory, so as to seamlessly constitute a processed image with a dimension of M×N to replace the captured or recorded image.

According to another preferred embodiment, the image processing method is used to process a captured or recorded image with a dimension of M×N stored in an external memory; M and N are both integers larger than 1. Furthermore, the image processing method includes the following steps.

First of all, a plurality of first image tiles divided from the image stored in the external memory are sequentially read. Each of the first image tiles has a dimension of p×q and overlaps with the adjacent first image tiles; p is an integer larger than 1 and less than M, and q is an integer larger than 1 and less than N.

Afterward, an image processing procedure is sequentially performed for the first image tiles.

Subsequently, the first image tiles are sequentially processed into a plurality of second image tiles. Each of the second image tiles has a dimension of m×n; m is a natural number less than p, and n is a natural number less than q.

Finally, sequentially writing the second image tiles are sequentially written into the external memory to seamlessly constitute a processed image with a dimension of M×N to replace the captured or recorded image.

BRIEF DESCRIPTION OF THE APPENDED DRAWINGS

DETAILED DESCRIPTION OF THE INVENTION

The present invention provides an image processing apparatus and method. Particularly, the image processing apparatus and method of the invention is a tile-based apparatus and method, which can decrease the width of the buffer and further reduce the hardware cost. The preferred embodiments are disclosed as below.

Figure 1:
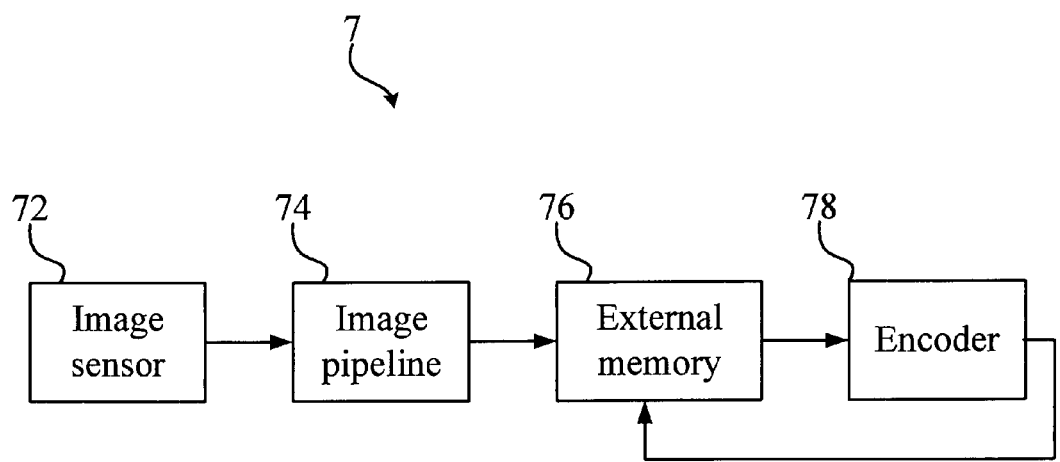
FIG. 1 is a functional block of an image processing apparatus of the prior art.
Figure 2:
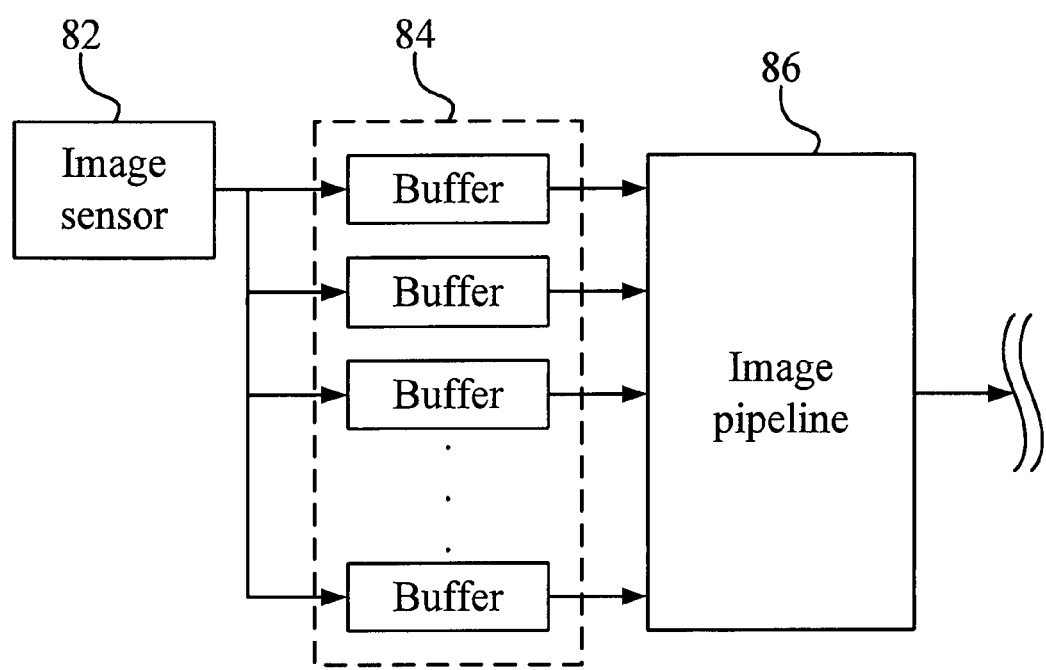
FIG. 2 is a functional block of an image processing apparatus of the prior art.
Figure 3:
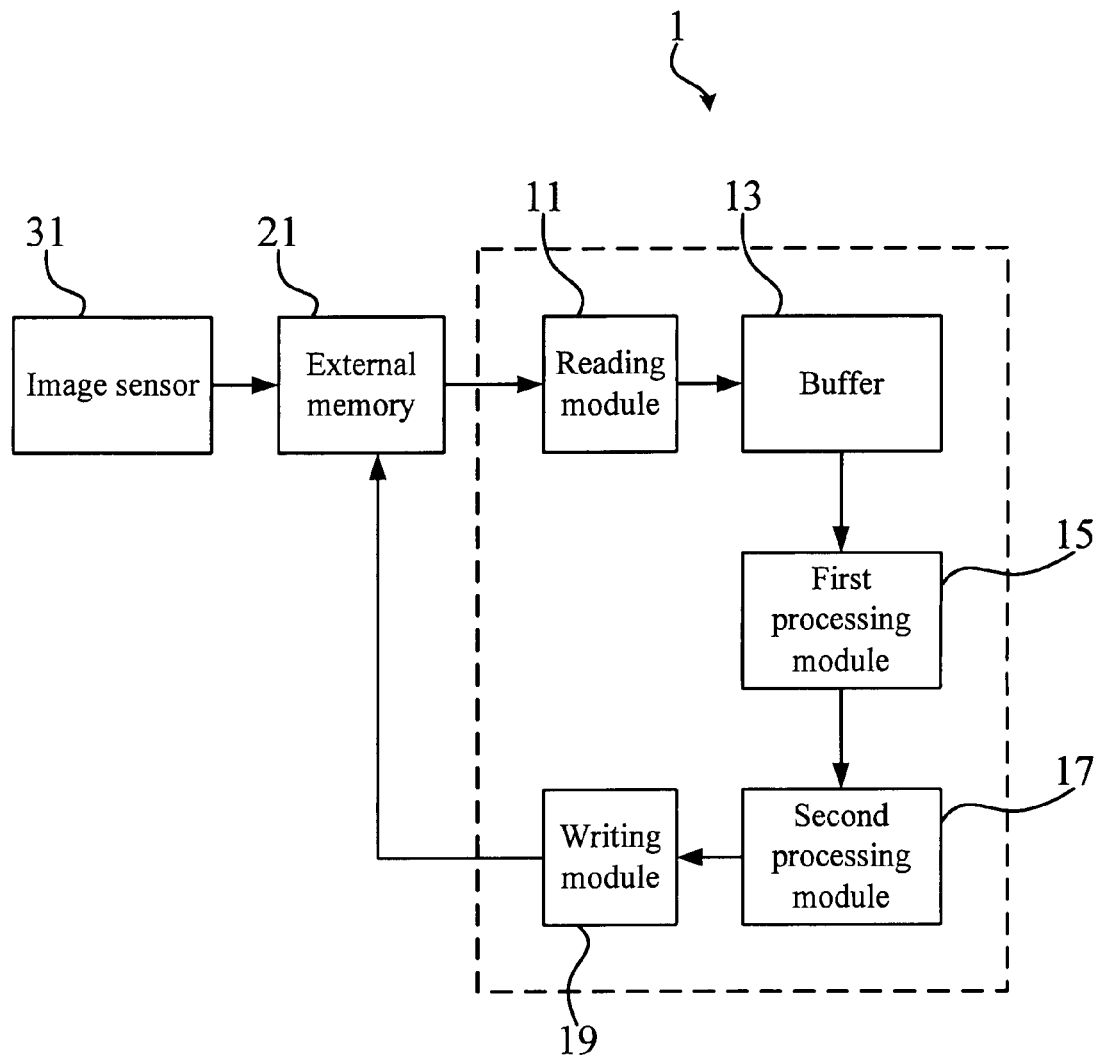
FIG. 3 shows a functional block of the image processing apparatus of a preferred embodiment of the invention.

Please refer to FIG. 3, which illustrates the image processing apparatus of a preferred embodiment of the invention. As shown in FIG. 3, the image processing apparatus 1 includes a reading module 11, a buffer 13, a first processing module 15, a second processing module 17, and a writing module 19.

Particularly, the image processing apparatus 1 is used to process a captured or recorded image with a dimension of M×N; M and N are both integers larger than 1. Moreover, the image is captured or recorded by an image sensor 31, such as a CCD or CMOS. After the image sensor 31 captured or recorded the image, it transfers the image to an external memory 21, and the image is stored in the external memory 21. Please note that the dimension of the captured or recorded image herein refers to the number of pixels contained by the image, i.e. the captured or recorded image contains M×N pixels.

Additionally, the reading module 11 is coupled to the external memory 21, for sequentially reading a plurality of first image tiles divided from the image stored in the external memory 21, and each of the first image tiles has a dimension of p×q and overlaps with the adjacent first image tiles; p is an integer larger than 1 and less than M, and q is an integer larger than 1 and less than N.

Figure 4A:
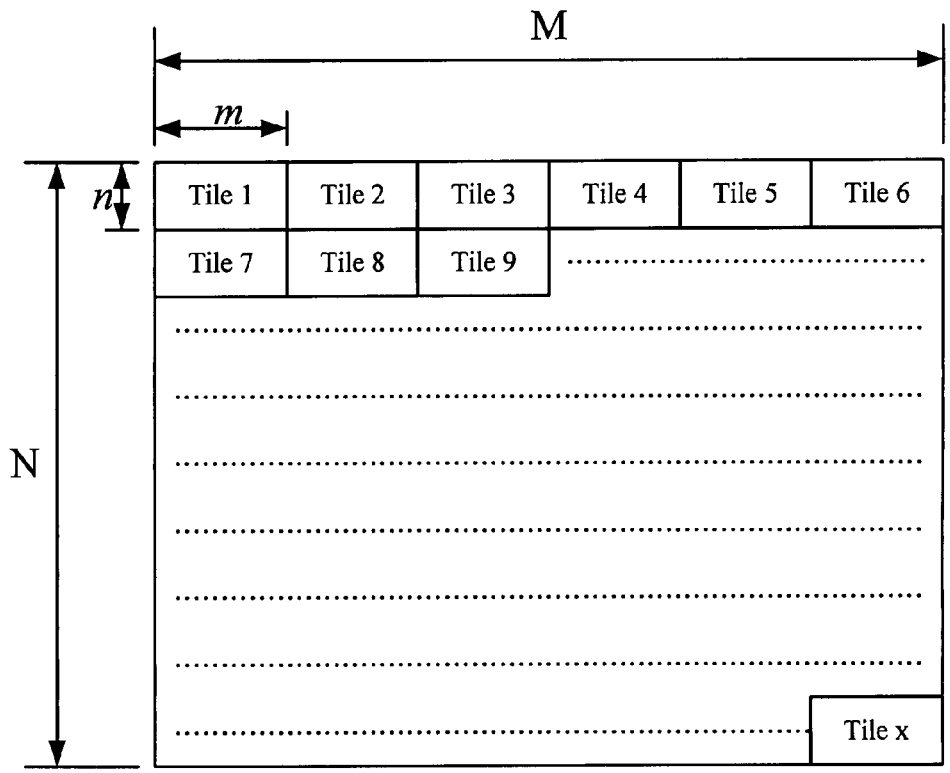
FIG. 4A illustrates a diagram of the captured or recorded image of the invention.

Please also refer to FIG. 4A, which shows a diagram of the captured or recorded image. As described above, the dimension of the captured or recorded image is M×N, and the captured or recorded image is divided into x first image tiles (Tile 1 to Tile x); the actual dimension of each first image tile is m×n, wherein m is a natural number smaller than p, and n is a natural number smaller than q.

Figure 4B:
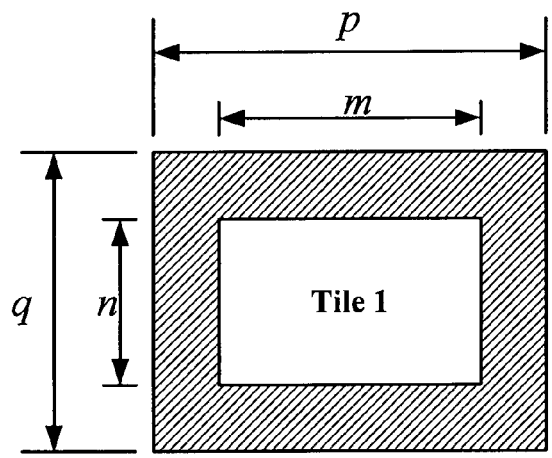
FIG. 4B illustrates a diagram of the dimension of a first image tile of FIG. 4A when the first image tile is read from the external memory by the reading module in FIG. 3.

Please further refer to FIG. 4B, which illustrates a diagram of the dimension of a first image tile (Tile 1) of FIG. 4A when Tile 1 is read from the external memory 21 by the reading module 11 of FIG. 3. As shown in FIG. 4B, when the reading module 11 sequentially reads the first image tiles (e.g. in the sequence of Tile 1, Tile 2, Tile 3, . . . Tile x of FIG. 4A), the dimension of the read first image tile is p×q. Therefore, each of the read first image tiles is overlapped with the adjacent first image tiles (the area with slash line in FIG. 4B).

Also as shown in FIG. 3, the buffer 13 is coupled to the reading module 11, for sequentially buffering the first image tiles read by the reading module 11. Furthermore, the first processing module 15 is coupled to the buffer 13, for sequentially performing an image processing procedure for the first image tiles buffered in the buffer 13.

In an embodiment, the first processing module includes F number of 2D filters, each of which has a dimension of $a_i \times b_i$; F is a natural number, whereas i is an integer index ranging from 1 to F, and p and q meet the following formulae:

$$p = m + \sum_{i=1}^{F} \text{floor}(q/2) \times 2; \text{ and}$$

$$q = n + \sum_{i=1}^{F} \text{floor}(b_i/2) \times 2.$$

In an embodiment, the image processing procedure as mentioned above can include, but not limited to, an image conversion, such as RGB/YUV image conversion, a color interpolation, a noise reduction, an edge enhancement, a color correction, a gamma correction, and an image scaling. Practically, one or more of the image processing procedures can be combined to be an image pipeline for processing the captured or recorded image.

In addition, the second processing module 17 is coupled to the first processing module 15, for sequentially processing the first image tiles processed by the first processing module 15 into a plurality of second image tiles, and each of the second image tiles has a dimension of m×n; m is a natural number less than p, and n is a natural number less than q.

The writing module 19 is coupled to the second processing module 17 and the external memory 21 respectively, for sequentially writing the second image tiles into the external memory 21, so as to seamlessly constitute a processed image with a dimension of M×N to replace the captured or recorded image. In other words, the processed image matches with the captured or recorded image.

Figure 5:
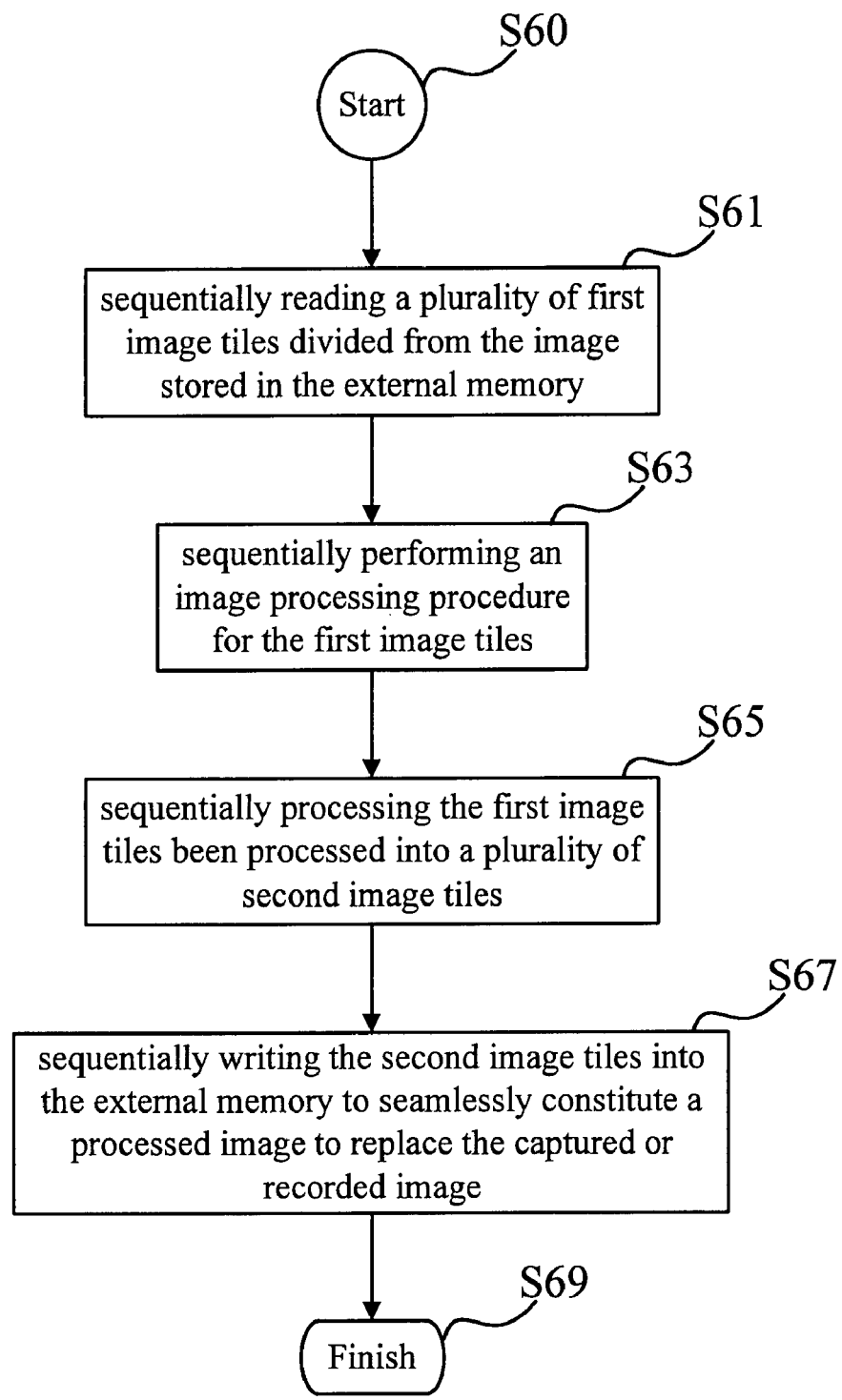
FIG. 5 shows a flow chart of the method of a preferred embodiment of the invention.

Referring to FIG. 5, which shows a flow chart of the method of another preferred embodiment of the invention. As mentioned above, the method is used to process a captured or recorded image with a dimension of M×N stored in an external memory, M and N both being integers larger than 1. As shown in FIG. 5, the method includes the following steps.

In step S61, a plurality of first image tiles divided from the image stored in the external memory are sequentially read. Moreover, each of the first image tiles has a dimension of p×q and overlaps with the adjacent first image tiles; p is an integer larger than 1 and less than M, and q is an integer larger than 1 and less than N.

In step S63' an image procedure for the first image tiles is sequentially performed. In an embodiment, the above mentioned step S63 is performed by F number of 2D filters, which each has a dimension of $a_i \times b_i$; F is a natural number, and i is an integer index ranging from 1 to F. Furthermore, in the embodiment, p and q meet the following formulae:

$$p = m + \sum_{i=1}^{F} \text{floor}(q/2) \times 2; \text{ and}$$

$$q = n + \sum_{i=1}^{F} \text{floor}(b_i/2) \times 2.$$

In an embodiment, the image processing procedure as mentioned above can include, but not limited to, an image conversion, such as RGB/YUV image conversion, a color interpolation, a noise reduction, an edge enhancement, a color correction, a gamma correction, and an image scaling. Practically, one or more of the image processing procedures can be combined to be an image pipeline for processing the captured or recorded image.

In step S65, the first image tiles are sequentially processed into a plurality of second image tiles. Each of the second image tiles has a dimension of m×n; m is a natural number less than p, and n is a natural number less than q.

In step S67, the second image tiles are sequentially written into the external memory to seamlessly constitute a processed image with a dimension of M×N to replace the captured or recorded image.

Obviously, because the image processing apparatus and method of the invention belong to tile-based apparatus and method, the consumption of buffer can be reduced, thus reaching the objective of saving hardware resources. At the same time, the tile-based image processing apparatus and method of the invention can further reduce the hardware cost.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An image processing apparatus, for processing a captured or recorded image with a dimension of M×N, and being stored in an external memory, M and N both being integers larger than 1, said image processing apparatus comprising:
- a reading module, coupled to the external memory, for sequentially reading a plurality of first image tiles divided from the image stored in the external memory, wherein each of the first image tiles has a dimension of p×q and overlaps with the adjacent first image tiles, p being an integer larger than 1 and less than M, q being an integer larger than 1 and less than N;
- a buffer, coupled to the reading module, for sequentially buffering the first image tiles read by the reading module;
- a first processing module, coupled to the buffer, for sequentially performing an image processing procedure for the first image tiles buffered in the buffer;
- a second processing module, coupled to the first processing module, for sequentially processing the first image tiles processed by the first processing module into a plurality of second image tiles, wherein each of the second image tiles has a dimension of m×n, m being a natural number less than p, n being a natural number less than q; and
- a writing module, coupled to the second processing module and the external memory respectively, for sequentially writing the second image tiles into the external memory to seamlessly constitute a processed image with a dimension of M×N to wherein the first processing module comprises F number of 2D filters which each has a dimension of $a_i \times b_i$, F being a natural number, i being an integer index ranging from 1 to F, $a_i$ and $b_i$ being dimensions of the i-th 2D filter, $a_i$ and $b_i$ being dimensions of the i-th 2D filter, p and q meet the following formulae:

$$p = m + \sum_{i=1}^{F} \text{floor}(a_i/2) \times 2; \text{ and}$$

$$q = n + \sum_{i=1}^{F} \text{floor}(b_i/2) \times 2.$$

2. The image processing apparatus of claim 1, wherein the image processing procedure comprises one selected from the group consisting of an image conversion, a color interpolation, a noise reduction, an edge enhancement, a color correction, a Gamma correction, and an image scaling.

3. The image processing apparatus of claim 2, wherein the image conversion is an RGB/YUV conversion.

4. An image processing method for processing a captured or recorded image with a dimension of M×N stored in an external memory, M and N both being integers larger than 1, said image processing method comprising the steps of:
- (a) sequentially reading a plurality of first image tiles divided from the image stored in the external memory, wherein each of the first image tiles has a dimension of p×q and overlaps with the adjacent first image tiles, p being an integer larger than 1 and less than M, q being an integer larger than 1 and less than N;
- (b) sequentially performing an image processing procedure for the first image tiles;
- (c) sequentially processing the first image tiles that has been processed into a plurality of second image tiles, wherein each of the second image tiles has a dimension of m×n, m being a natural number less than p, n being a natural number less than q; and
- (d) sequentially writing the second image tiles into the external memory to seamlessly constitute a processed image with a dimension of M×N to wherein the first processing module comprises F number of 2D filters which each has a dimension of $a_i \times b_i$, F being a natural number, i being an integer index ranging from 1 to F, $a_i$ and $b_i$ being dimensions of the i-th 2D filter, $a_i$ and $b_i$ being dimensions of the i-th 2D filter, p and q meet the following formulae:

$$p = m + \sum_{i=1}^{F} \text{floor}(a_i/2) \times 2; \text{ and}$$

$$q = n + \sum_{i=1}^{F} \text{floor}(b_i/2) \times 2.$$

5. The image processing method of claim 4, wherein the image processing procedure comprises one selected from the group consisting of an image conversion, a color interpolation, a noise reduction, an edge enhancement, a color correction, a Gamma correction, and an image scaling.

6. The image processing method of claim 5, wherein the image conversion is an RGB/YUV conversion.

* * * * *